Figure 1:
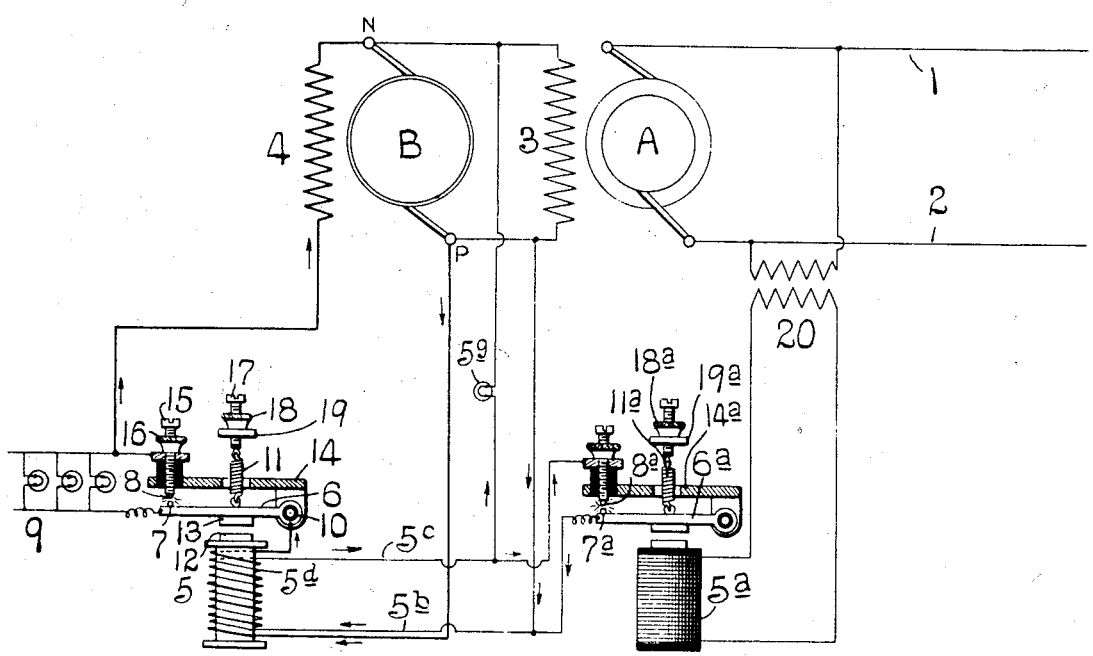

No. 862,274. PATENTED AUG. 6, 1907.
G. S. NEELEY.
VOLTAGE REGULATOR FOR DYNAMO ELECTRIC MACHINES.
APPLICATION FILED NOV. 30, 1906.

2 SHEETS—SHEET 1.

Witnesses
A. J. McCauley
Geo. R. Ladson

Inventor:
George S. Neeley
by Bakewell Cornwall
Atty's.

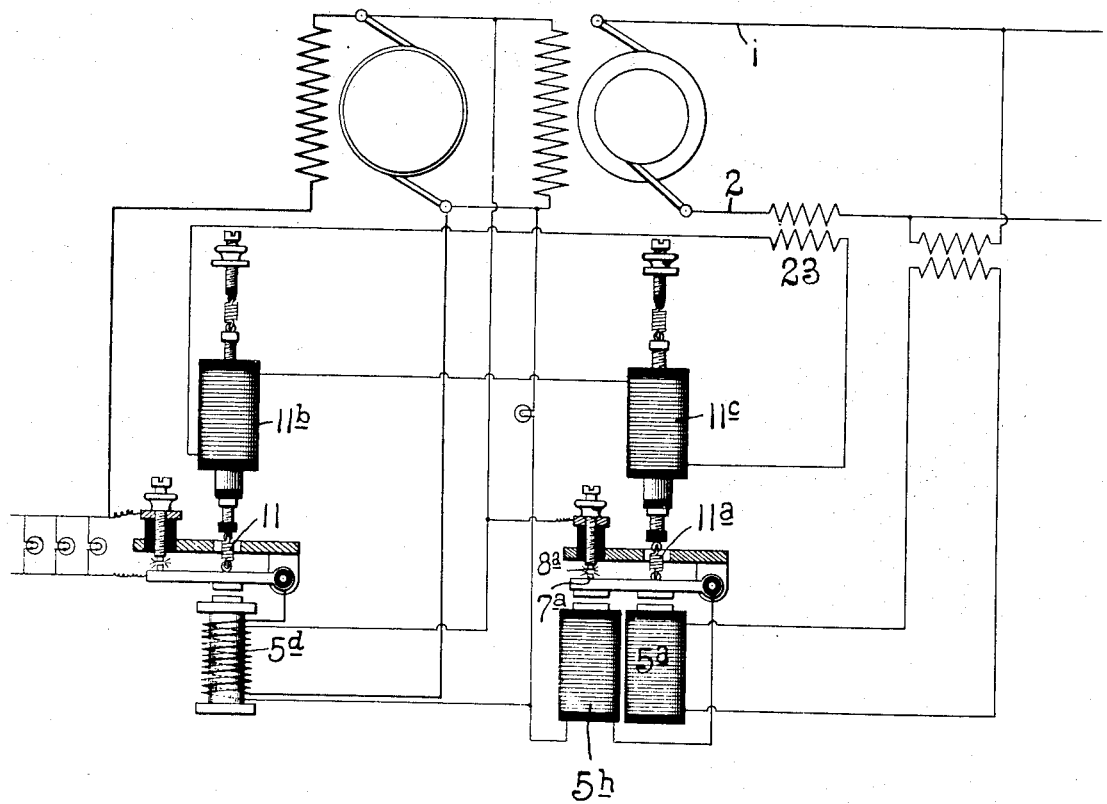

UNITED STATES PATENT OFFICE.

GEORGE S. NEELEY, OF ST. LOUIS, MISSOURI.

VOLTAGE-REGULATOR FOR DYNAMO-ELECTRIC MACHINES.

No. 862,274.

Specification of Letters Patent.

Patented Aug. 6, 1907.

Application filed November 30, 1906. Serial No. 345,791.

*To all whom it may concern:*

Be it known that I, GEORGE S. NEELEY, a citizen of the United States, residing at St. Louis, Missouri, have invented a certain new and useful Improvement in Voltage-Regulators for Dynamo-Electric Machines, of which the following is a full, clear, and exact description, such as will enable others skilled in the art to which it appertains to make and use the same, reference being had to the accompanying drawings, forming part of this specification, in which—

Figure 1 is a diagrammatic view showing a system involving my improved automatic voltage regulator for alternating current generators; and Fig. 2 is a diagrammatic view illustrating a modified form of said system.

This invention relates to new and useful improvements in automatic voltage regulators for alternating current generators, the object being to automatically maintain a constant voltage in the work circuit or system, regardless of the demands for current upon the working dynamo.

In the accompanying drawings, A is an alternating current generator and B is its exciter.

1 and 2 are the primary mains extending from the generator A, and 3 is the field coil of said generator.

4 is the field winding of the exciter B. The arrow heads indicate the direction in which the exciter field current travels. Starting from the positive brush P of the exciter, the field current passes through the main winding of magnet 5 thence to the pivoted armature 6. Part of the current passes across the contacts 7 and 8, the former of which is carried by the pivoted armature, while the latter is a fixed adjustable contact, and the rest of the current passes through the resistances 9, preferably in the form of specially made incandescent lamps with a negative temperature coefficient, the two parts of the field current then joining and flowing through the field winding 4, thence to the negative brush N of the exciter, thus completing the field circuit.

Armature 6 is pivoted at 10 and is influenced in one direction by the spring 11 which tends to close the gap between the contacts 7 and 8. Magnet 5, when energized, tends to open the gap between said contacts 7 and 8. The influence of magnet 5 is augmented by the magnetic effort of the pole face 12, which attracts the iron "keeper" 13 mounted on the movable armature 6. Contact 8 is stationarily mounted, but adjustable, in the stationary support 14. A contact-carrying screw 15 is held normally in position by the jam nut 16. The tension of spring 11 is made adjustable by the screw 17 and the jam nut 18 working in a stationary support 19.

When the contact 7 is in its extreme position away from the contact 8, the greatest resistance that can be offered to the field current of the exciter is set up in the field circuit of the exciter; and if the contact 7 should impinge against the stationary contact 8 the field circuit of the exciter would then contain no effective regulating resistance at all. All intermediate positions of the contact 7 between these extreme positions automatically create a proportional and effective regulating resistance in the form of an arc in the field circuit of the exciter, the value of which is varied when a change of current output occurs by changing the strength of the forces which act upon the armature 6.

If we assume for the moment that all of the current passing from the positive brush of the exciter passes through the main winding of magnet 5, and thence to the pivoted armature 6, it will be seen that, depending upon the strength of the magnet 5 tending to pull the armature 6 in one direction to separate contacts 7 and 8, in opposition to the tension of the spring 11, tending to pull said armature in the opposite direction, to close said contacts, the current will be divided, part of it passing through the contacts 7 and 8 and part through the resistance 9, depending upon which path offers the least resistance. In this manner the gap between the contacts 7 and 8 constitutes an automatic variable resistance in the field circuit of the exciter, around which the field current in said field circuit may be shunted through the resistance 9.

From the above it will be observed that the alternating current generator A has its field energized by the exciter B, and that the means for regulating the field resistance of the exciter consists of a variable resistance in series with the field of the exciter, which resistance is controlled by differential forces resulting from placing the intensity of the field current of the exciter in opposition to a yielding mechanical force, and supplying a shunt resistance 9 having a negative temperature coefficient to relieve said variable resistance.

My present invention contemplates the employment of means for automatically maintaining a constant voltage in the work circuit of the system regardless of the conditions or demands on the current of the working dynamo, and consists essentially of an auxiliary winding $5^d$ supplied by a current through wires $5^b$ and $5^c$, in the latter of which is a resistance in the form of the lamp $5^g$. This winding $5^d$ is across the brushes of the exciter B and may be short-circuited by the cut-out devices now about to be described. The short-circuiting device of this auxiliary winding $5^d$ consists of the following: A magnet $5^a$ is across the secondary winding of a potential transformer 20, the primary of which is across the mains 1 and 2. Attention is directed to the fact that the magnet 5 is now primarily influenced by the intensity of the exciter field current and secondarily by the voltage across the brushes P and N, while the magnet $5^a$ is influenced by the voltage across the mains 1 and 2. Magnet $5^a$ exerts a pull upon an armature $6^a$ carrying a movable contact $7^a$ which coöperates with an adjustable fixed contact $8^a$, the latter being mounted upon a stationary support $14^a$. A spring $11^a$ mounted in a stationary support $19^a$ and whose tension is adjustable, is connected to the armature $6^a$ and tends to close contacts $7^a$ and $8^a$, while the magnet $5^a$ tends to open said contacts. The contact point $8^a$ may be adjusted by providing means similar to those heretofore described in connection with the contact 8, and the tension of spring $11^a$ may be adjusted in a manner similar to the adjustment of the spring 11 heretofore described.

Wires $5^b$ and $5^c$ constitute a by-pass around the auxiliary winding $5^d$ of magnet 5, and connect respectively to a stationary contact $8^a$ and a movable contact $7^a$, so that when these contacts are closed the auxiliary winding $5^d$ of magnet 5 is short-circuited, and when these contacts are in their extreme open position the resistance offered by the air gap in the form of an arc between the contacts $7^a$ and $8^a$ causes all of the field current to flow through the auxiliary winding of magnet 5. All excess energy derived from the auxiliary winding, beyond the initial adjustment, is thus automatically shunted around or is utilized in the auxiliary winding of magnet 5 by the action of a magnet $5^a$ working against the tension of spring $11^a$.

From the above it will be observed that the main winding of magnet 5, which is in series with the field of the exciter, is at no time short-circuited. The auxiliary winding $5^d$, however, may be short-circuited, in which event the pull of magnet 5 will not be wholly diminished, but only partly so, and consequently the energy of the magnet 5 is not abruptly disturbed or changed, but is gradual and deliberate in its action.

Assuming that the generator A and exciter B are running at normal speed, the operation of the above described parts is as follows: The tension of spring 11 is adjusted until the opposing pull of magnet 5 balances, we will say, at 98 volts, across the secondary terminals of the potential transformer 20, (it being desired to ultimately obtain a normal of 100 volts, the final adjustment should be made later), the voltage of the alternating mains 1 and 2 will be accurately maintained, as long as there is no change in the current output, because the incremental action of the exciter field current (and assisted by the slight energy of the voltage across the brushes P and N in the auxiliary winding $5^b$), traversing the winding of the magnet 5 tends to increase the resistance to its own flow, while the tension of spring 11 tends to decrease said resistance. The voltage of the alternating mains 1 and 2 now being such as to give 98 volts at the secondary terminals of the potential transformer 20, the tension of springs $11^a$ is adjusted until some of the current traversing the auxiliary winding of magnet 5 is diverted or shunted through the by-pass wires $5^b$ and $5^c$ and the contacts $7^a$ and $8^a$. This action causes magnet 5 to become weaker. As the tension of spring 11 continues constant after adjustment, it becomes stronger than the pull of magnet 5, and consequently the distance between the contacts 7 and 8 is shortened. This causes the exciter field current to increase its flow in the same inverted ratio as the distance between the contacts 7 and 8 is lessened, and the direct result will be that the voltage in the alternating mains 1 and 2 will be raised instantly, and when the 100 volt-point is reached across the secondary of the transformer 20, the jam nut $18^a$ should be firmly tightened down to lock the adjusting devices of the spring $11^a$. As the generator A and exciter B are running at normal speed and the system has been adjusted to give a normal of 100 volts at the secondary terminals of the transformer 20, we will assume that it takes three-fourths of an ampere of current in the exciter field winding 4 to excite up to the normal alternating current voltage, and further, that one-half ampere is flowing through the main winding of magnet 5 and the remaining one-fourth ampere is flowing through the auxiliary winding of magnet 5 and the by-pass wires $5^b$ and $5^c$ and the contacts $7^a$ and $8^a$. Should there be an increase in the current output in the mains 1 and 2 under these conditions, the result will be a drop in the voltage in the mains 1 and 2, then the pull of magnet $5^a$ will be weakened in proportion. This action causes a momentary short-circuiting of the auxiliary winding of magnet 5 by the instantaneous closing of the gap between the contacts $7^a$ and $8^a$, resulting from the pull of spring $11^a$. Spring 11 now acts to gradually shorten the distance between the contacts 7 and 8, which results in increasing the field excitation until normal voltage is restored in the primary mains 1 and 2. When normal voltage is restored, magnet $5^a$ will prevent the voltage from rising above normal by removing the short circuit from around the auxiliary winding of magnet 5, by opening the gap between the contacts $7^a$ and $8^a$. When this occurs, the voltage in the auxiliary winding becomes effective and as a result the pull of magnet 5 is gradually increased until all movement of magnet 5 is finally stopped, because the resistance 9 becomes so effective that all of the parts will assume their normal steady condition as before. The reverse action takes place when the load or current output is decreased on the mains 1 and 2. Under these conditions of decreasing load or current output the potential across the mains 1 and 2 will momentarily exceed normal, which results in magnet $5^a$ acting to separate the contacts $7^a$ and $8^a$, which would cause the full energy of the auxiliary winding $5^b$ to become effective. Magnet 5, by this assistance from the auxiliary winding, will separate contacts 7 and 8, and the resistance 9 will be made gradually effective in the field circuit of the exciter. These conditions tend to reduce the field current of the exciter, and of course the voltage of the alternating current generator will be correspondingly reduced until normal voltage on the mains 1 and 2 is again reached. When normal voltage is reached, the tension of spring $11^a$ equals the pull of magnet $5^a$, at which time short-circuiting action of the contacts $7^a$ and $8^a$ again becomes effective across the auxiliary winding $5^b$. From the above it will be seen that as soon as normal voltage has been reached either the action of spring $11^a$ or magnet $5^a$ predominates and becomes effective, causing the total energy of magnet 5 to become more or less effective.

In Fig. 2, I have illustrated a modified system in which a magnet $5^h$ is in series with the variable resistance in shunt around the auxiliary winding $5^d$. This magnet assists the magnet $5^a$ in tending to open the contacts $7^a$ and $8^a$ when the winding $5^b$ is short circuited, and gradually becomes weaker and less effective as the contacts 7ª and 8ª are separated and resistance placed in the shunt circuit. A further object of this auxiliary magnet 5 is to magnetically utilize the energy of the electric current that is diverted from passing through the auxiliary winding 5ᵇ, thus securing greater sensitiveness by a more perfect utilization of energy that would otherwise be wasted. 11ᵇ and 11ᶜ are magnets, preferably of the solenoid type, whose cores are connected to the springs 11 and 11ª respectively. These magnets 11ᵇ and 11ᶜ are operated by the intensity of the current output derived from the secondary of a series transformer 23. These transformers are employed to automatically supplement the action of springs 11 and 11ª respectively in proportion to the current output. The purpose of this is to increase the voltage across the mains 1 and 2 to compensate for line losses. The results obtained from the magnetizing effect upon the mains 1 and 2 is the same as if the tension of the springs 11 and 11ª was manually increased proportional to the increase of current output, which action, as before explained, increases the alternating current voltage; and likewise the action is the same as if the tension of the springs 11 and 11ª was decreased proportional to the load decrease. By the use of the magnets 11ᵇ and 11ᶜ the action is accurate and automatic for all extreme and intermediate conditions of load increase or decrease.

The advantages of my improved system are many, chief among which may be mentioned the fact that the controlling elements are operated almost wholly by electro-mechanical forces which render the system very positive and sensitive in its action, causing the deliverance of a very steady voltage on the supply wires without the use of dash pots. There is no sparking at the contact points, and hence there is no need for condensers and differential windings on the magnets for the purpose of suppressing arcing at the contacts.

While I have described my improvement as being expressly applicable to alternating current systems where the generators are separately excited, it is obvious that my improvement is also applicable to direct current systems, and with slight modifications may be employed in connection with self-excited generators.

As the voltage and the current output of the generator are both utilized in my regulating system the same may be expressed by the term "Watt output", which comprehends a proportional part of the total output of the generator.

Having thus described the invention, what is claimed as new and desired to be secured by Letters Patent is:

1. The combination with a dynamo electric machine whose field is energized by an exciter, of means for regulating the field resistance of the exciter in response to differential forces resulting from placing the intensity of the field current and the voltage of the exciter in opposition to mechanical means exerting a yielding force, and means for varying the force derived from the voltage of the exciter; substantially as described.

2. The combination with a dynamo electric machine whose field is energized by an exciter, of means for regulating the field resistance of the exciter in response to differential forces resulting from placing the intensity of the field current and the voltage of the exciter in opposition to a mechanically yielding force, supplying a shunt resistance having a negative temperature coefficient to relieve said resistance, and means for varying the force derived from the voltage of the exciter; substantially as described.

3. The combination with an electric generator whose field is energized by an exciter, of means for regulating the field resistance of the exciter in response to differential forces resulting from placing the intensity of the field current and the voltage of the exciter in opposition to a mechanically yielding force, and supplementary means whereby the current output of said generator magnetically regulates the action of the electro-magnetic force derived from the voltage of the exciter by varying the force derived from the voltage of said exciter; substantially as described.

4. The combination with an electric generator whose field is energized by an exciter, of means for regulating the field resistance of the exciter in response to differential forces resulting from placing the intensity of the field current and the voltage of the exciter in opposition to a mechanically yielding force, supplementary electro-mechanical means whereby the voltage of the current output of the said generator is made to mechanically regulate the magnetic action obtained from the voltage of the exciter by varying the force derived from the voltage of the exciter, and shunt resistances having negative temperature coefficiencies to relieve said resistances; substantially as described.

5. The combination of an electric generator, an exciter therefor, means for regulating the field resistance of the exciter in response to differential electro-mechanical forces resulting from the intensity of the exciter field current and the voltage of the exciter working in electro-magnetic opposition to the force of a spring, means for varying the force derived from the voltage of the exciter proportional to the voltage of said generator; substantially as described.

6. The combination of an electric generator and its exciter, a variable resistance in series with the field of the exciter, the said resistance being responsive to the action of a magnet having a supplementary winding across the brushes of said exciter, and a mechanically yielding force, the main winding of said magnet being in circuit with the exciter field, the said mechanically yielding force arranged in mechanical opposition to the total force of said magnet, electro-mechanical means for causing the supplementary winding of said magnet to be short-circuited by the voltage of the said generator, and a second magnet for assisting the mechanically yielding means; substantially as described.

7. The combination with an alternating current generator and its exciter, of electro-magnetic means energized jointly by the field current and the voltage of the exciter for regulating the excitation of the alternating current generator, and differential coils energized respectively by the current and by the voltage of the work circuit of the system for regulating the effectiveness of the exciter voltage in the first-mentioned means; substantially as described.

8. The combination of means energized by the field current and the voltage of the exciter for regulating the resistance in the field circuit of the exciter of an alternating current generator, and means energized simultaneously by the Watt output of the work circuit of the system for regulating the energy derived from the exciter voltage utilized in the first-mentioned means; substantially as described.

9. The combination of electro-mechanical means for regulating the resistance in the field circuit of the exciter of an alternating current generator, and means energized simultaneously by the Watt output of the work circuit of the system for rendering a part of said first-mentioned means ineffective; substantially as described.

10. The combination with means for regulating the resistance in the field circuit of the exciter of an alternating current generator, said means including a magnet having separate windings, one of which is in series with the field of the exciter, a shunt containing a variable resistance around the other winding of said magnet, and means energized simultaneously by the Watt output of said alternating current generator for varying said last-mentioned resistance; substantially as described.

11. The combination with means for regulating the resistance in the field circuit of the exciter of an alternating current generator, said means including a magnet having two separate windings, one of which is in series with the field of the exciter and the other of which is energized by a circuit across the brushes of said exciter, a shunt containing a variable resistance around said last-mentioned winding, and a magnet energized by the voltage and current output of the generator for varying said last-mentioned resistance; substantially as described.

12. The combination with means for regulating the resistance in the field circuit of the exciter of an alternating current generator, said means including a magnet whose main winding is in series with the field of the exciter, said magnet having an auxiliary winding in a circuit across the brushes of said exciter, a shunt containing a variable resistance around said auxiliary winding, electro-magnetic means for increasing said variable resistance, and electro-mechanical means for decreasing said variable resistance; substantially as described.

13. The combination with means for regulating the field resistance in the field circuit of the exciter of an alternating current generator, said means including a magnet whose main winding is in series with the field of the exciter, said magnet having an auxiliary winding across the brushes of said exciter, a shunt containing a variable resistance around said auxiliary winding, and a magnet energized by the potential of the current output of the generator for varying said resistance; substantially as described.

14. The combination with means for regulating the field resistance in the field circuit of the exciter of an alternating current generator, said means including a magnet whose main winding is in series with the field of the exciter, said magnet having an auxiliary winding across the brushes of said exciter, a shunt containing a variable resistance around said auxiliary winding, electro-mechanically operated means for decreasing said variable resistance, and electro-magnetically operated means in opposition to said electrically operated means for decreasing said variable resistance; substantially as described.

15. The combination with a magnet whose main winding is in series with the field of the exciter of an alternating current generator, said magnet having an auxiliary winding across the brushes of said exciter and being operable to regulate the resistance in said circuit, of means energized by the work circuit of the system for short-circuiting the auxiliary winding of said magnet; substantially as described.

16. The combination with a magnet whose main winding is in series with the field of the exciter of an alternating current generator, said magnet having an auxiliary winding across the brushes of said exciter and being operable to regulate the resistance in the field circuit of the exciter, of a magnet energized by the work circuit of the system for regulating the effectiveness of said auxiliary winding, a yielding mechanical force in opposition to said last-mentioned magnet, and a magnet 11$^c$ energized by the current output of said alternating current generator for assisting said yielding mechanical force; substantially as described.

17. The combination with an alternating current generator, the field of which is energized by an exciter, means for regulating the field resistance of the exciter, said means comprising a magnet having a main winding in series with the field of the exciter, and an auxiliary winding across the brushes of said exciter, said magnet being opposed to a yielding mechanical force, a magnet 5$^a$ energized by the work circuit of the system for regulating the effectiveness of the auxiliary winding of said first-mentioned magnet, a yielding mechanical force in opposition to said magnet 5$^a$, and magnets 11$^b$ and 11$^c$ energized by the current output of said alternating current generator for assisting said yielding mechanical forces respectively; substantially as described.

18. The combination with a magnet having a main winding in series with the field of the exciter of an alternating current generator, and an auxiliary winding across the brushes of said exciter, said magnet being operable to regulate a resistance in the field circuit of said exciter, a shunt having a variable resistance around said auxiliary winding, a magnet 5$^a$ energized by the work circuit of the system for increasing said variable resistance, a magnet 5$^b$ in said shunt circuit for assisting the action of magnet 5$^a$, and a yielding mechanical force in opposition to the action of said magnets 5$^a$ and 5$^b$; substantially as described.

19. The combination with a magnet having a main winding in series with the field of the exciter of an alternating current generator, and an auxiliary winding across the brushes of said exciter, said magnet being operable to regulate a resistance in the field circuit of said exciter, a shunt having a variable resistance around said auxiliary winding, a magnet 5$^a$ energized by the work circuit of the system for increasing said variable resistance, a magnet 5$^b$ in said shunt circuit for assisting the action of magnet 5$^a$, and a yielding mechanical force in opposition to the action of said magnets 5$^a$ and 5$^b$, and a magnet 11$^c$ energized by the current output of the said alternating current generator for assisting said yielding mechanical force; substantially as described.

20. The combination of a separately-excited electric generator, of a regulating resistance and a magnet having a series and a shunt winding, the series winding being in circuit with the regulating resistance and the field of the exciter, the shunt winding being across the brushes of the said exciter, and means for varying the effectiveness of the exciter voltage in said shunt winding; substantially as described.

21. The combination of a dynamo and its exciter, means for controlling the field current of the said exciter, a magnet having a plurality of windings, one of said windings being in circuit with the field of the said exciter and the first-mentioned means, another winding of said magnet being across the brushes of said exciter, a shunt containing a variable resistance around said last-mentioned winding, and a mechanically adjustable means for initially regulating the effectiveness of the said variable resistance; substantially as described.

22. The combination of an electric generator whose field is energized by an exciter, of an automatic variable resistance in the field circuit of the exciter, a magnet having a main and a supplementary winding, said main winding being also in circuit with the exciter field winding, the supplementary winding being across the brushes of the said exciter, a short-circuiting device across the said supplementary winding, and means for controlling the said short-circuiting device in response to the voltage of the said generator; substantially as described.

23. The combination of an electric generator whose field is energized by an exciter, of means for regulating the resistance of the field circuit of the exciter in response to an electro-magnet having two parallel windings, one of said windings being energized by the exciter field current, and the other winding by the voltage of the said exciter, a constant resistance in circuit with the last mentioned windings of the said electro-magnet, and automatic means for controlling a short-circuit around the last mentioned winding of said magnet in response to the voltage of said generator; substantially as described.

24. The combination of an electric generator, an exciter therefor, electro-magnetic means for increasing the field regulating resistance of the exciter, mechanical means for decreasing said regulating resistance, a coil on the said electro-magnetic means in series with the regulating resistance, a second coil across the brushes of the exciter, and auxiliary electro-magnetic means for controlling a periodic short-circuit across the last-mentioned coil, proportional to the voltage of the said generator; substantially as described.

In testimony whereof I hereunto affix my signature in the presence of two witnesses, this twenty-sixth day of November 1906.

GEORGE S. NEELEY.

Witnesses:
F. R. CORNWALL,
LENORE WILSON.